Nov. 28, 1950 — E. M. LIEBERMAN — 2,532,174
MOWER
Filed Oct. 25, 1946 — 2 Sheets-Sheet 2
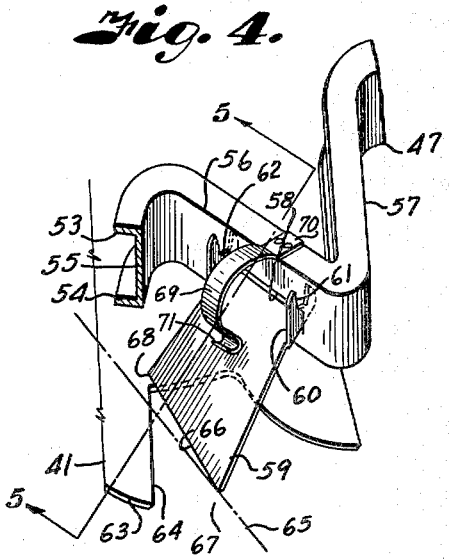
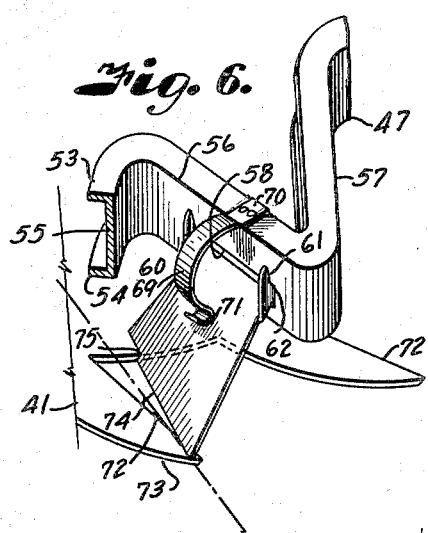
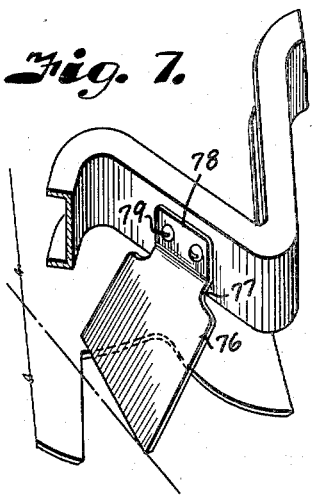
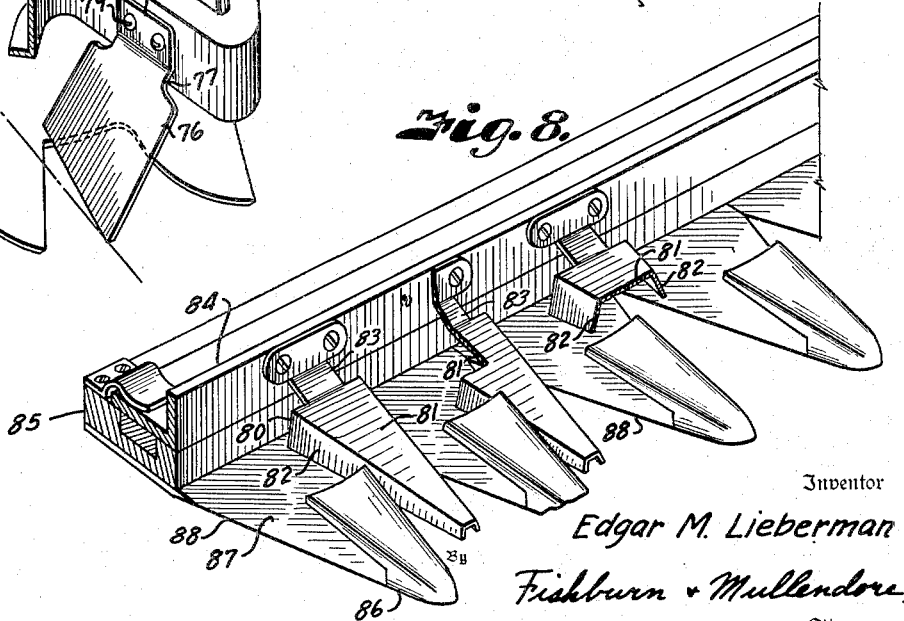
Inventor
Edgar M. Lieberman
Fishburn & Mullendore
Attorney Patented Nov. 28, 1950

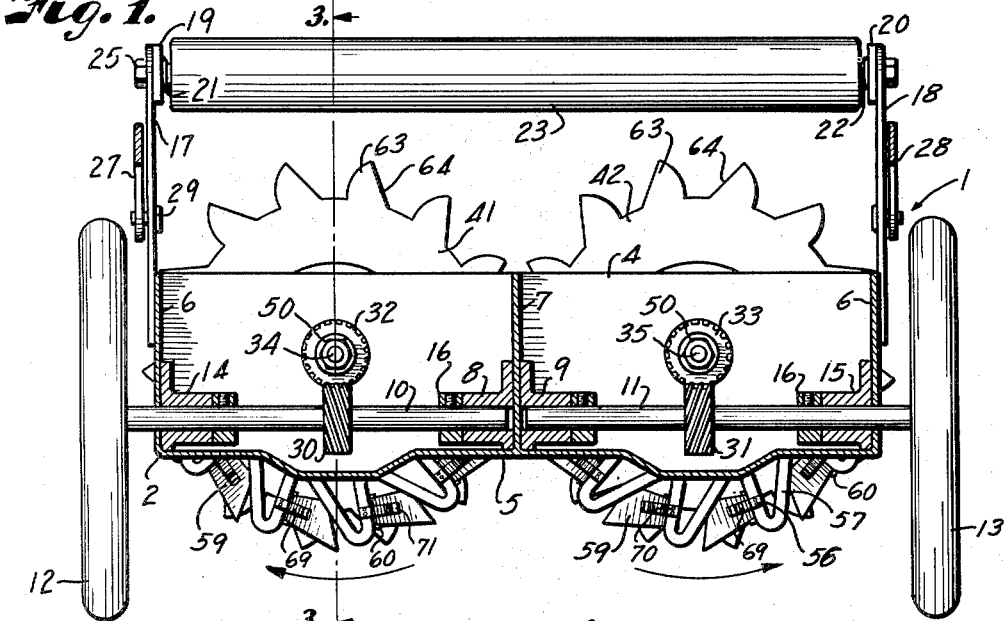

2,532,174

UNITED STATES PATENT OFFICE 2,532,174

MOWER

Edgar M. Lieberman, Kansas City, Mo.

Application October 25, 1946, Serial No. 705,607

6 Claims. (Cl. 56—255)

This invention relates to mowers, and more particularly to a mower for cutting lawns, weeds and the like, and especially to a mower wherein the cutting of the grass is effected by means of a series of flexible blades cooperating with moving knives or a plurality of cutting teeth.

The principal objects of the present invention are to provide a mower having movable cutting teeth which move past a series of flexible counter blades providing a shearing action for cutting grass and the like, said shearing action tending to sharpen the blades; to provide a mower with flexibly mounted blades cooperating with a rotary cutter, said blades arranged at an angle relative to the plane of rotation of the cutter whereby pressure created by cutting of the grass tends to tighten the blades on the cutter; to provide a rotary cutter and stationary blade assembly adjustably mounted vertically on the mower to vary the height of the cut; and to provide a lawn mower that is relatively light in weight, durable, yet economical to manufacture and easily maintained.

In accomplishing these and other objects of the present invention, I have provided improved details of structure, the preferred form of which is illustrated in the accompanying drawing wherein:

Fig. 1 is a horizontal sectional view through a mower embodying the features of the present invention on the line 1—1, Fig. 3.

Fig. 2 is a plan view of the mower cutter, counter blades and counter holder therefor, particularly illustrating the relative positions of the blades and cutter.

Fig. 3 is a vertical sectional view through the mower on a line 3—3, Fig. 1.

Fig. 4 is an enlarged detailed perspective view of the counter blade and support illustrating the relative positions of the counter blade and cutter.

Fig. 5 is an enlarged vertical sectional view through the counter blade mounting on the line 5—5, Fig. 4.

Fig. 6 is an enlarged perspective view of a modified form of cutter and counter blades.

Fig. 7 is an enlarged perspective view of a modified form of mounting of the counter blades.

Fig. 8 is an enlarged perspective view of a modified form of cutter wherein the counter blades are arranged for use with a reciprocating type of cutter bars.

Referring more in detail to the drawings:

1 designates a mower comprising a housing 2 having top and bottom walls 3 and 4 respectively connected by front and end walls 5 and 6. Centrally located in the housing is a vertical partition 7 mounting bearings 8 and 9 on each side thereof adapted to support the inner end of shafts 10 and 11 that extend outwardly through the end walls of the housing to mount wheels 12 and 13 respectively. Bearings 14 and 15 are mounted on the inside of the end walls in alignment with the bearings 8 and 9 to support the outer ends of the shafts 10 and 11, thrust collars 16 being mounted on the shafts 10 and 11 and having engagement with the bearings 8, 9, 14 and 15 to prevent lateral movement of the shafts 10 and 11.

Secured to the end walls of the housing by welding or the like and extending rearwardly therefrom are arms 17 and 18 and mounted on the ends of said arms are brackets 19 and 20 having trunnions 21 and 22 to rotatably support a roller 23. The brackets 19 and 20 preferably are provided with a plurality of openings 24 whereby the height of the ends of the arms 17 and 18 may be adjusted relatively to the ground by placing bolts 25 in selected openings 24 according to the height desired. A handle member 26 is attached to the mower by means of yoke members 27 and 28 pivotally mounted on the arms 17 and 18 by suitable pins or the like 29, the location of the connection between the handle yoke members and the arms 17 and 18 being spaced rearwardly of the housing 2 whereby force for moving the mower is directed substantially toward the point of contact between the wheels 12 and 13 and the ground.

Suitably keyed to the shafts 10 and 11 are preferably spiral gears 30 and 31 meshing with spiral gears 32 and 33, slidably mounted on vertical shafts 34 and 35, said gears 32 and 33 being keyed to the shafts 34 and 35 by suitable keys 36. The shafts 34 and 35 are supported in the housing 2 by means of bearings 37 mounted on the bottom 4 of the housing 2, the shafts extending downwardly through said housing. The lower ends of the shafts 34 and 35 are provided with reduced threaded portions 38 providing shoulders 39 for mounting a cutter are now to be described.

Sleeved over the reduced portions 38 are washers 40 bearing against the shoulders 39 to provide upper backing plates for the cutters 41 and 42 which are sleeved over the reduced portions 38 into engagement with the washers 40 on the respective shafts 34 and 35. Washers 43 are placed over the reduced portions 38 and nuts 44 threaded thereon to rigidly secure the cutter on the shafts 34 and 35. Rotatably mounted on the shafts 34 and 35 are collars 45 and 46 adapted to rest on the washers 40 for carrying a member 47 which supports counter blades as later described.

The upper ends of the shafts 34 and 35 are provided with reduced threaded portions 48 adapted to receive a nut 49 and a lock nut 50 thereon which may be threaded downwardly onto the gears 32 and 33 to support the cutters thereon, said gears resting on washers 51 on the bearings 37. In order to adjust the height of the cutter and counter blade assembly, the nuts 49 and 50 are threaded on or off of the threaded portions 48 of the shafts 34 and 35. Collars 52 may be sleeved over the reduced portions 48 of the shafts to provide a spacer between the nuts 49 and the respective gears 32 and 33.

With the structure thus far described, the cutters 41 and 42 are so arranged that the cutting teeth slightly overlay as at 42', the cutter 41 being mounted slightly above the cutter 42 and as will be obvious, when the mower is pushed, the traction of the wheels 12 and 13 will rotate the respective shafts 10 and 11 to turn the spiral gears 30 and 31 which have teeth so arranged that the spiral gears 32 and 33 will be rotated to drive the cutters 41 and 42 as shown by the arrows in Fig. 1.

The counter blade supporting member 47 preferably is of channel cross-section having upper and lower flanges 53 and 54 connected by a vertical web 55. The ends of the member 47 are secured to the collars 45 and 46 as by welding and extend outwardly therefrom toward the wheels of the mower as shown in Fig. 2. The intermediate portion is shaped in substantially reverse bends forming blade supporting arms 56, arranged substantially on radii from the shafts 34 and 35, the outer ends of one arm 56 being connected to the inner end of the adjacent arm by sections 57. The webs of each of the arms 56 are provided with elongated openings 58 adapted to receive counter blades 59 preferably formed of spring steel. The counter blades 59 consist of flat strips, the upper ends being provided with ears 60 which are turned upwardly and slotted as at 61. The ears are adapted to be inserted into the openings 58 in the arms 56 and the open ends of said slots engage the web of said arms at the top of said openings as at 62, said slots being slightly wider than the web of the arms whereby there is movement between the counter blades and said arms. The counter blades extend downwardly at an angle to the plane of rotation of the cutters 41 and 42 to provide an angle of approximately 45° therewith, said counter blades extending downwardly in a direction opposite to the direction of rotation of the cutters. The cutters 41 and 42 are provided with a plurality of cutting teeth 63, the cutting edges 64 thereof being arranged at an angle relative to the radius indicated at 65 in Fig. 4 of the circles defined by the outer edges of the teeth 63, said circles being coaxial with the shafts 34 and 35. The lower edges of the counter blades are also arranged at an acute angle to the radius as illustrated in Fig. 4 whereby the angle of approach of the cutting edges 64 toward the cutting edges 66 of the counter blades or angle defined by said cutting edges at the points of intersection thereof provides a shear action for cutting grass and the like. With the cutter teeth arranged as in Fig. 4 the outer end or trailing portion 67 of the counter blade is preferably lower than the inner end or leading portion 68, the inner end riding on the solid part of the cutters 41 and 42, whereby said counter blade is raised as the teeth 63 pass thereunder. This arrangement assures contact between the cutting teeth and the counter blades and positive cutting of the grass.

The pressure exerted on the counter blades during cutting of grass and the like tends to hold the ears on said blades in engagement with the web 55 of the arms 56. In order to assist in flexibly holding the blades 59 in engagement with the cutters 41 and 42 a spring 69 is provided, each of said springs having an end 70 preferably secured to the upper flange of the respective arm and an end 71 engaging the respective blade.

In the form of the counter blade and cutter illustrated in Fig. 6 the cutting edge 72 of the cutter teeth 73 is arranged whereby the outer point leads the root of said teeth. In this form the lower or cutting edge 74 of the counter blade first engages the outer end of the cutter tooth and in order to provide shear throughout the length of the blade, the cutting edge slopes downwardly toward the cutter shaft. The inner end or trailing portion of the blade is offset as at 75 whereby the blade is supported on the cutter and the outer end of the blade is substantially the same height as the cutter. The counter supporting arm, and the mounting for the counter blade, is the same structure as described in connection with Fig. 4.

Fig. 7 shows a modified mounting for the counter blade wherein the upper end 76 is reduced in width as at 77 and bent upwardly forming a flange 78 which is secured to the arm 56 by fastening devices such as screws 79. Since the blade is formed of spring steel this mounting provides flexibility tending to hold the counter blade in engagement with the cutter.

In operating a mower such as described, the lock nut 50 is loosened and the nut 49 threaded upwardly or downwardly to adjust the height of the cutters 41 and 42, the gears 32 and 33 resting upon the washers 51 and bearing 37 to support the cutters and counter blade assembly. After the cutters have been adjusted to cut the proper height, the lock nut 50 is tightened to hold the blades in adjusted position. It is sometimes desirable to shift the blades slightly, which may be done by removing the screws 25 and inserting them through other holes 24 in the brackets 19 and 20 to adjust the height of the roller relative to the housing and provide a slight tilt to the mower. The mower is then pushed by means of the handle 26, the traction wheels 12 and 13 independently rotating the shafts 10 and 11, the gears 30 and 31 driving the gears 32 and 33 to rotate the cutters 41 and 42. Movement of the cutters 41 and 42 during forward movement of the mower will cut the grass caught between the cutting edge 64 of the cutter teeth 63 and the counter blade cutting edge 66 to positively cut the grass. This device will cut small weeds and the like without damage to the cutting edges. The shear action of the cutting edges tends to provide a self-sharpening feature to this mower. However, it is frequently desirable to true the cutting edges and each of the counters may be easily removed by lifting same until the slots 62 are disengaged from the supporting arms 56. The edges of the counter blades may then be filed or otherwise sharpened, care being had to maintain the leading portion or outer edge 67 lower than the trailing portion or edge 68 to maintain the shear action between the cutter and the counter blades.

In the form of the invention as shown in Fig. 8, counter blades 80 are formed of flat spring steel to provide a web 81 having downwardly extending flanges 82 on the sides thereof, the edges of said flanges forming cutting edges. Integral with the web is a rearwardly extending arm 83 terminating in an upwardly extending flange suitably fastened to a reciprocating member 84. The reciprocating member operates in a guide 85 to which is applied a plurality of forwardly extending teeth 86 having an upper face 87 on which the cutting edges of the flanges 82 engage. The sides of the teeth are sharpened as at 88 to cooperate with the counter blades to form a shear action for cutting grass and the like, the relative angularity of the flanges 82 and sides of the teeth being suitable to cut the grass and the spring action of the arms 83 holding the counter blades in engagement with the teeth. As the cutter counter blades are reciprocated by the member 84 and moved forwardly over an area to be cut, grass or the like moving between the cutting edges will be cut by the shear action of the cutting edges.

It is believed obvious that I have provided a simple positive mower using flexibly mounted counter blades in cooperation with a movable cutter to efficiently cut grass and the like. It will be noted that the individual counter blades may be removed for repair or sharpening without disturbing the other structure of the mower.

What I claim and desire to secure by Letters Patent is:

1. A mower of the character described comprising, a pair of traction wheels, a frame carried by said traction wheels, a horizontally disposed cutter mounted on said frame and having cutting teeth extending outwardly on the cutter and having cutting edges on the leading side thereof, flexible counter blades mounted above the cutter and extending downwardly into engagement with said cutter, the plane of the counter blades being at an acute angle to the plane of the cutter with the lower edge of said blade at an acute angle to the cutting edges of the teeth, the trailing portion of the lower edge of the blades being lower than the leading portion to provide a shear cutting action, resilient means engaging said counter blades for holding the lower edges of said blades in engagement with the cutter, and means connected with the wheels for actuating the cutter.

2. A mower of the character described comprising, a pair of wheels, a frame carried by said wheels, a circular cutter rotatably mounted on the frame and having its periphery provided with cutting teeth, said teeth having cutting edges on the leading side thereof, flexible counter blades pivotally mounted above the circular cutter and extending downwardly into engagement with said cutter, said counter blades sloping toward the cutting edges of the teeth at an acute angle to said cutter, resilient means engaging said counter blades for holding the lower edges of said blades in engagement with the cutter, said counter blades having a cutting edge on the lower end thereof at an acute angle to the cutting edges of the teeth of the circular cutter to provide a shear action to cut grass, and means connecting the wheels with the circular blade to rotate said blade upon rotation of the wheels.

3. A mower of the character described comprising, a pair of wheels, a frame carried by said wheels, a circular cutter rotatably mounted on the frame and having its periphery provided with cutting teeth, said teeth having cutting edges on the leading side thereof, blade carrying means mounted above the cutter teeth, counter blades pivotally mounted on said blade carrying means and inclined downwardly therefrom toward the cutting edges of the teeth and at an acute angle to said cutter, means for holding the lower edge of the counter blades in engagement with the cutter, said counter blades having a cutting edge on the lower end thereof at an acute angle to the cutting edges of the teeth of the circular blade, the trailing portion of the lower edge of the blades being lower than the leading portion whereby the engagement of the cutting edges during rotation of the cutter will pivot the blades, and means for rotating the circular blade.

4. A mower of the character described comprising, a pair of wheels, a frame carried by said wheels, a vertically arranged shaft adjustably and rotatably carried by said frame, a circular cutter mounted on the lower end of said vertically arranged shaft and having its periphery provided with cutting teeth, said teeth having cutting edges on the leading side thereof, stationary means carried by the vertically arranged shaft and having horizontally slotted arms extending over the cutter teeth in vertically spaced relation thereto, flexible counter blades having notched ears engaging in the slots of the arms to pivotally mount the blades on said stationary means, said blades being inclined downwardly from the arms toward the cutting edges of the teeth at an acute angle to the cutter, said counter blades having a cutting edge on the lower end thereof at an acute angle to the cutting edges of the teeth of the circular blade, the trailing portion of the lower edge of the blades being lower than the leading portion whereby the engagement of the cutting edges during rotation of the cutter will pivot the blades, and means connecting the wheels with the vertically arranged shaft to rotate the circular blade upon rotation of the wheels.

5. A mower of the character described comprising, a pair of wheels, a frame carried by said wheels, a circular cutter having cutting teeth on the periphery thereof rotatably mounted on the frame, each of said teeth having a cutting edge on the leading side thereof, a plurality of counter blades having a straight cutting edge mounted to contact the upper surface of the circular cutter at an acute angle relative to the cutting edge of the circular cutter teeth, the trailing portion of the edge of said counter blades being lower than the leading portion of the cutting edge to provide a shear action between said counter blades and the cutting edge of the circular cutter teeth, means for supporting said counter blades above the circular cutter, and means for driving the circular cutter.

6. A mower of the character described comprising, a pair of wheels, a frame carried by said wheels, a plurality of circular cutters having cutting teeth on the periphery thereof rotatably mounted on the frame, each of said teeth having a cutting edge on the leading side thereof, a plurality of flexible stationary blades mounted above the circular cutters and extending downwardly into contact with the upper surface of the circular cutter at an acute angle thereto, the lower edge of said blades being straight and at an acute angle relative to the cutting edge of the circular cutter teeth, the outer portion of the lower edge of said stationary blades being lower than the inner portion of said edge to provide a shear action between said stationary blades and the circular cutters, means engaging the stationary blades for holding the lower edge of said stationary blades in engagement with the circular cutters, and means for rotating the circular cutters.

EDGAR M. LIEBERMAN.

REFERENCES CITED

The following references are of record in the file of this patent:

UNITED STATES PATENTS

| Number | Name | Date |
| --- | --- | --- |
| 1,153,943 | Montague | Sept. 21, 1915 |
| 1,351,185 | Muzzy | Aug. 31, 1920 |
| 2,267,944 | Osterholm | Dec. 30, 1941 |

FOREIGN PATENTS

| Number | Country | Date |
| --- | --- | --- |
| 7,404 | Great Britain | July 30, 1908 |